Patented Feb. 2, 1926.

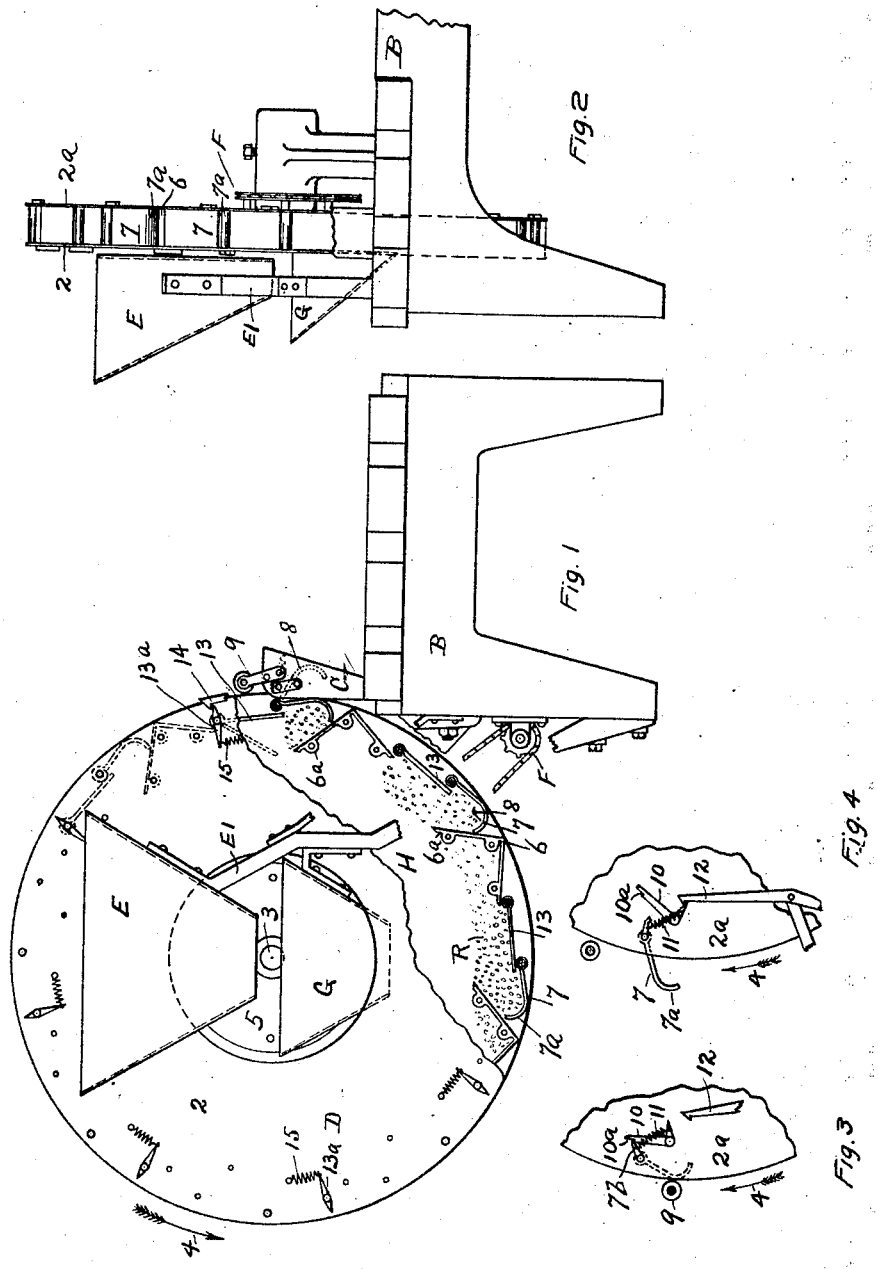

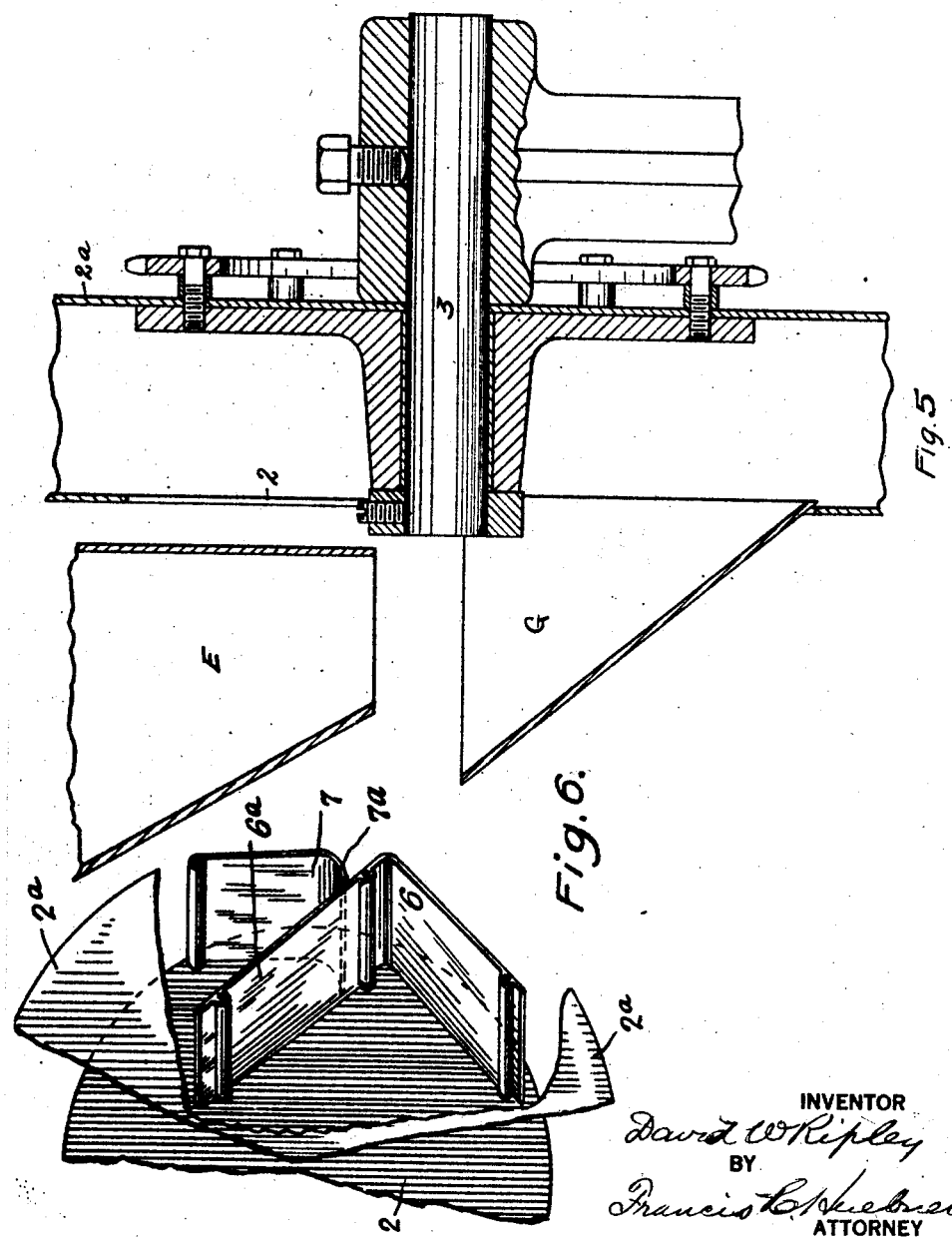

1,571,459

UNITED STATES PATENT OFFICE.

DAVID W. RIPLEY, OF FRESNO, CALIFORNIA.

AUTOMATIC MEASURING MACHINE.

Refiled for abandoned application Serial No. 547,611, filed March 29, 1922. This application filed June 1, 1925. Serial No. 34,251.

*To all whom it may concern:*

Be it known that I, DAVID W. RIPLEY, a citizen of the United States, and resident of Fresno, in the county of Fresno and the State of California, have invented a new and useful Improvement in Automatic Measuring Machines, for which an application was made by me for a patent on this device on March 29th, 1922, Serial Number 547,611, which by an inadvertence was abandoned.

The following is a specification:

My invention relates to an automatic measuring machine and more particularly to a device of that class which will automatically measure raisins, rice, flour and similar articles of merchandise which are semi-flowing. The objects I have attained are the accurate measuring of such merchandise, especially raisins, without crushing or bruising the fruit and after the measurement discharging the full contents of the measure into a carton or container, the discharging operation being quick and effective.

I accomplish these objects by means of the device hereinafter described and illustrated on the accompanying drawing in which Figure 1 is a side view of the measuring wheel having parts cut away to show the inside mechanism, and a table adjacent thereto. Figure 2 shows the periphery of the measuring wheel disclosed in Figure 1. Figure 3 is a detailed view of the dog which operates the opening mechanism of a unit measure. Figure 4 is a view of the same mechanism shown in Figure 3 in operative relation. Figure 5 is a sectional view of a portion of the measuring wheel showing the relation of the feeding hopper thereto. Figure 6 is an enlarged view of a measuring pocket for holding the merchandise. In said drawing B is the supporting table. D is the completed measuring wheel hereinafter described in detail. C is a chute into which the merchandise after being measured is discharged, and E is a container for holding the raisins or merchandise to be fed into the measuring wheel.

The measuring wheel consists of two discs 2 and $2^a$ arranged with relation to each other so they are coaxial, on parallel planes and a spaced distance apart, and adapted to rotate on the axis 3 the direction indicated by the arrow 4. A circular portion of the disc 2 concentric with the disc is removed forming an opening 5 to the space between the discs. I have placed a plurality of fixed partitions 6 between the discs equidistant from each other. These partitions are preferably formed angular, with the angle portion adjacent to the periphery of the discs. It is here noted that the partitions 6 could be shaped otherwise than shown, the features of said partition which are important being that it extends to the periphery of the discs and connects the two discs. The wall $6^a$ of said partition forms with the walls of the discs adjacent thereto, three sides of the measuring pocket or cup, the fourth side and the bottom being composed of a swinging wall 7, extending between the discs and pivoted at the top so that when partition 7 is swung even with the periphery of the discs, or inside thereof, pocket or cup 8 is formed, the curved portion $7^a$ forming the bottom thereof. When the partition 7 is swung outward from the periphery the bottom of the cup 8 is opened and its contents are discharged. I have adapted the bottom of the cup to be normally closed by means of a cam roller 9 which is placed adjacent to the periphery of the discs so that when the partition 7 passes it, it is positively pressed into position closing the bottom of the cup, and it is held in that position by means of a dog 10 having a notch $10^a$ therein which engages an extension $7^b$ on the wall 7. A trip 12 is provided to release the dog 10 from engagement with extension $7^b$, and when trip 12 functions, a spring 11 suddenly pulls the swinging partition 7 to a position so that the bottom of the cup is opened and the contents can be removed therefrom. Inasmuch as the opening of wall 7 is done suddenly by means of a spring 11, suction is formed by the movement of the wall which assists in rapidly discharging the contents from the cup.

It is noted that the trip 12 is positioned so that it functions when the cup is adjacent to the discharge chute C so the contents of the cup are discharged therein and the cam roller is positioned so that the swinging wall is adjusted to close the bottom of the cup immediately after passing the discharge opening.

The hopper G is positioned independently of the wheel D so that it can continuously discharge raisins through opening 5 into the chamber H between discs 2 and 2ª while wheel D is rotating. The raisins or merchandise to be weighted is designated in the drawing as R. It will be noted that by the force of gravity the raisins will be deposited in the bottom of chamber H and as wheel D rotates the cup 8 will retain the raisins as they are moved to a vertical position, and when the cup reaches the discharge chute C the swinging wall 7 is moved and the raisins will slide down the wall 6ª into the discharge chute.

For the purpose of measuring more accurately I have provided a stroker blade 13 which works on a pivot so that it strokes the raisins above a fixed level from the top of the cup. Blade 13 is operated by means of a lever 13ª attached to the blade, and swung at a predetermined point in the travel of wheel D by being engaged with a trip 14. This trip moves the blade across the top of cup 8, brushing therefrom surplus raisins or merchandise, and when it has thus functioned spring 15 normally returns the blade to a position so that the cup 8 can be readily filled with raisins when it reaches the lowest point on its circumferential travel. It is here noted that greater accuracy in measuring is had by the fact that the cups are always heaped with raisins, and the stroking motion equalizes the measurements.

F is a gear and chain for driving the wheel D. In the drawing I have shown a plurality of unit cups and stroker blades spaced equidistant apart. It is noted that the wheel D may contain one or more such units.

Having described my invention, I claim as new:

1. In combination with a measuring device having a revolvable container, openings within the container for placing merchandise therein, a pocket within the container positioned so it will be dragged through the merchandise with the mouth of the pocket forward on the line of travel, said pocket having a bottom adapted to be opened, means for normally holding the bottom in a closed position, and means for opening the bottom at a fixed point in the revolution of the container.

2. In combination with a measuring device having a revolvable container, a plurality of pockets attached together a spaced distance apart an equal radial distance from the axis of the container, each pocket having one side and the bottom formed integral and hinged so that the bottom can be opened, means for normally closing said bottom and keeping it closed, and means for opening said bottom at a fixed point in the revolution of the container.

3. In a device of the character described, a revolvable container, a plurality of pockets within the container spaced apart, said pockets being equal radial distances from the axis of the container, a bottom adapted to be opened, means for keeping said bottom closed, means for brushing off any merchandise heaped above a predetermined level in the pocket while said bottom is closed, and means for opening said bottom at a fixed point in the revolution of the container.

4. In a measuring device the combination of a container adapted to revolve vertically, said container having an intake opening, a plurality of pockets within the container, on a circumferential line, equal radial distances from the axis of the container, and positioned so the mouth of the pocket is forward on the line of travel, each pocket having a side and bottom formed integral, hinged at the top of the side, and adapted to be opened, timed means for closing the bottom and holding it closed, and timed means for opening said bottom by a sudden and swift movement.

5. In an automatic measuring device the combination of a container adapted to revolve vertically, a plurality of pockets within the container, on a circumferential line, and at equal radial distances from the axis of the container, each pocket having a side and bottom formed integral, hinged at the top of the side, and adapted to be opened, timed means for closing the bottom and holding it closed, and timed means for opening said bottom by a sudden and swift movement, timed means for stroking therefrom a surplus of merchandise heaped on said pocket.

DAVID W. RIPLEY.